(12) United States Patent
Carreiro

(10) Patent No.: US 10,589,902 B2
(45) Date of Patent: Mar. 17, 2020

(54) SYSTEMS, METHODS, AND APPARATUS FOR TRANSFERRING A SUBSTANCE BETWEEN CONTAINERS

(71) Applicant: Dale A. Carreiro, Charlotte, VT (US)

(72) Inventor: Dale A. Carreiro, Charlotte, VT (US)

(73) Assignee: Dale A. Carreiro, Charlotte, VT (US)

( * ) Notice: Subject to any disclaimer, the term of this patent is extended or adjusted under 35 U.S.C. 154(b) by 172 days.

(21) Appl. No.: 15/675,064

(22) Filed: Aug. 11, 2017

(65) Prior Publication Data

US 2018/0044063 A1    Feb. 15, 2018

Related U.S. Application Data

(60) Provisional application No. 62/373,493, filed on Aug. 11, 2016.

(51) Int. Cl.
| | |
|---|---|
| *B67C 11/02* | (2006.01) |
| *B65D 25/46* | (2006.01) |
| *A47J 43/28* | (2006.01) |
| *B65D 47/04* | (2006.01) |
| *B65D 51/02* | (2006.01) |

(52) U.S. Cl.
CPC ............ *B65D 25/465* (2013.01); *A47J 43/28* (2013.01); *B65D 47/043* (2013.01); *B65D 51/02* (2013.01); *B67C 11/02* (2013.01)

(58) Field of Classification Search
CPC .... B65D 25/465; B65D 51/02; B65D 47/043; A47J 43/28; B67C 11/02
USPC .......................... 141/331, 333–334, 337–338
See application file for complete search history.

(56) References Cited

U.S. PATENT DOCUMENTS

| | | | |
|---|---|---|---|
| 2,262,538 A | | 11/1941 | Olson et al. |
| 3,169,643 A | * | 2/1965 | Roberts ................ G04D 1/0021 |
| | | | 141/286 |
| 3,400,867 A | * | 9/1968 | Giannone ................ B44D 3/12 |
| | | | 222/570 |
| 4,062,387 A | * | 12/1977 | Peniche .................. B67C 11/02 |
| | | | 141/337 |
| 4,195,710 A | * | 4/1980 | Garrison ................ F16N 31/004 |
| | | | 141/338 |
| 4,299,340 A | * | 11/1981 | Hrytzak .................. B65D 25/48 |
| | | | 222/189.07 |
| 5,065,977 A | | 11/1991 | Desjardin |
| 5,201,121 A | * | 4/1993 | Heiberg ................ A47J 43/287 |
| | | | 30/123 |
| 5,455,102 A | | 10/1995 | Tsai |
| 5,927,353 A | * | 7/1999 | Persson ................... B65B 39/00 |
| | | | 141/331 |
| 7,156,136 B1 | | 1/2007 | Kulas |

(Continued)

*Primary Examiner* — Nicolas A Arnett
(74) *Attorney, Agent, or Firm* — Cooley LLP

(57) ABSTRACT

Systems, apparatus, and methods are disclosed for transferring a substance into an open top container. More specifically, the present disclosure relates to systems, apparatus, and methods to reduce splashing, splattering, and/or spillage while transferring a fluid from one container to another. Even more specifically, the present disclosure relates to a kitchen utensil including a body member for positioning within the container, the body member having a surface for receiving the substance and guiding the substance into the container; and an attachment mechanism for removably securing the utensil to a wall of the container.

19 Claims, 8 Drawing Sheets

(56) References Cited

U.S. PATENT DOCUMENTS

| | | | |
|---|---|---|---|
| 7,513,392 B2* | 4/2009 | Fowler | B67C 11/02 |
| | | | 137/312 |
| 8,162,012 B2* | 4/2012 | Kulas | A47J 43/07 |
| | | | 141/338 |
| 8,393,045 B2 | 3/2013 | O'Reilly | |
| 9,622,621 B2* | 4/2017 | Brinkmann | F16M 13/02 |
| 9,845,233 B1* | 12/2017 | Stibinger | B67C 11/02 |
| 9,925,506 B2 | 3/2018 | Lutz et al. | |
| 2006/0185177 A1 | 8/2006 | Simard | |
| 2014/0283389 A1 | 9/2014 | Chang | |
| 2015/0307340 A1* | 10/2015 | Liu | B32B 15/20 |
| | | | 141/337 |

\* cited by examiner

SYSTEMS, METHODS, AND APPARATUS FOR TRANSFERRING A SUBSTANCE BETWEEN CONTAINERS

RELATED APPLICATIONS

This application claims priority to, and the benefit of, U.S. provisional application No. 62/373,493, filed Aug. 11, 2016, the entire content of which is incorporated herein by reference.

TECHNICAL FIELD

The present disclosure relates generally to systems, apparatus, and methods for transferring a substance, particularly a fluid, from one container to another with applications in kitchens, laboratories, workshops (e.g., automotive repair), healthcare facilities, etc. More specifically, the present disclosure relates to systems, apparatus, and methods to reduce splashing, splattering, and/or spillage while transferring a fluid from one container to another.

BACKGROUND

The transfer of a substance from one container to another is a common need in kitchens, laboratories, workshops, and many other settings. Fluids, in particular, may be difficult to transfer between containers without splashes, splatters, and/or spills that require cleaning up. Splashing, splattering, and/or spillage may be not only wasteful and messy but also contaminative, dangerous, and even life-threatening. For example, sensitive ingredients or harmful substances can result in cross-contamination and/or other hazards (e.g., fire, explosion, chemical exposure, allergic reaction, poisoning, etc.); hot substances (including hot tap water) can cause scalds and burn injuries or melt nearby materials; and substances on the floor can cause someone to slip and fall.

SUMMARY

The present disclosure introduces systems, apparatus, and methods to reduce splashing, spilling, or splattering while transferring a substance from one container into another. These systems, apparatus, and methods may be useful for safely and efficiently transferring substances in numerous settings, including in professional or domestic kitchen environments.

For example, a common cooking step involves combining ingredients (to make, e.g., a soup, sauce, or batter) by pouring one or more ingredients from one container into a second container with one or more ingredients. Other common kitchen tasks involve transferring a food substance from a first container to a second container for serving, storing, and/or transporting purposes. In restaurants and industrial kitchens, the sheer magnitude of food moving through the kitchen increases the need for efficiency and safety at these tasks. As a professional chef, the inventor recognized and appreciated that splashes, splatters, and spillage not only waste food and valuable time for cleanup but also threaten the safety of kitchen personnel and their customers.

The inventor considered that one device for transferring a substance between containers is a funnel, that is, a tube or pipe that is wide at the top and narrow at the bottom. However, a funnel is intended for guiding a substance into a small opening and not into, e.g., a wide-mouth pot or bowl. While a funnel could be mounted to second container, the time to mount and clean the additional hardware would be fussy and impractical in a busy kitchen. More importantly, the transfer of a substance to the wide opening of the funnel carries the same problems of splashing, splattering, and spillage.

In light of the above, the present disclosure is directed to improved systems, apparatus, and methods for transferring a substance between containers. These improvements encourage cleanliness, efficiency, and safety by reducing splashing, splattering, and/or spillage. At least some of these advantages are provided by the embodiments described herein.

In one aspect, the disclosure is directed to an apparatus for transferring a substance between containers. The apparatus comprises a body member for positioning within the receiving container and an attachment mechanism for removably securing the utensil to a wall of the receiving container such that a first portion of the surface is located within the receiving container and a second portion of the surface is located above the wall of the receiving container. The body member comprises a surface for receiving the substance and guiding the substance into the receiving container. In a further aspect, the apparatus reduces at least one of splashing, splattering, and spilling of the substance during transfer into the receiving container.

In another aspect, the disclosure is directed to a method for transferring a substance between containers. In some embodiments, the method comprises positioning the body member of an apparatus of the present disclosure within the receiving container and securing the utensil to the wall of the container. In some embodiments, the body member is attached in such a way that a first portion of the surface is located within the container and a second portion of the surface is located above the wall of the container. In some embodiments, the method further comprises pouring the substance to be transferred onto the second portion of the surface such that the substance is guided into the container. In a further aspect, the method reduces at least one of splashing, splattering, and spilling of the substance during transfer into the container.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
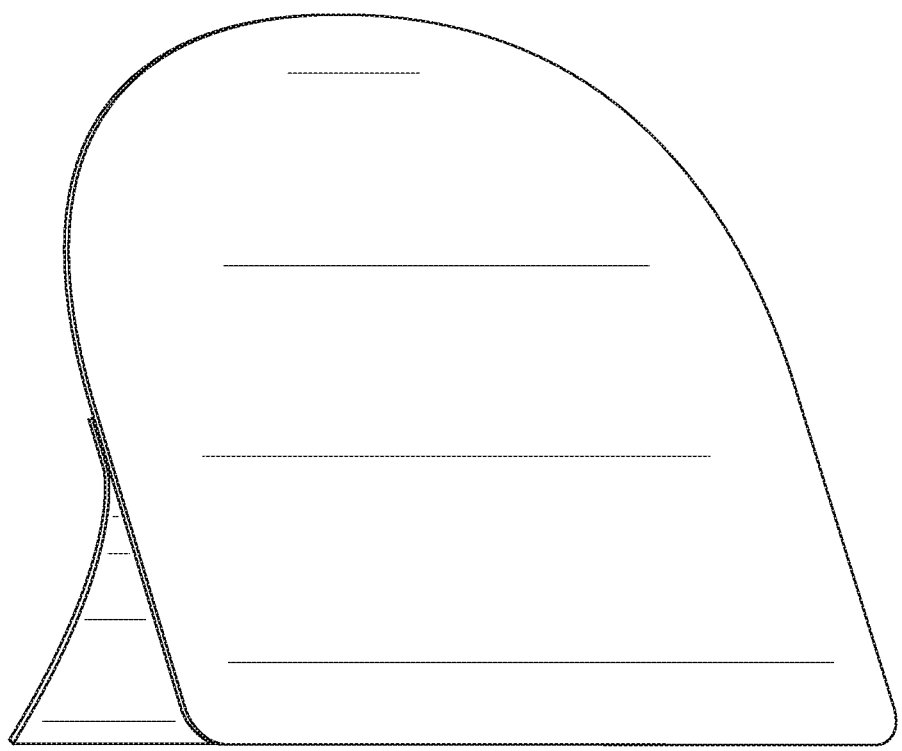
FIG. 1 illustrates the body member wherein, in accordance with some embodiments, the attachment mechanism is a flap.
Figure 2:
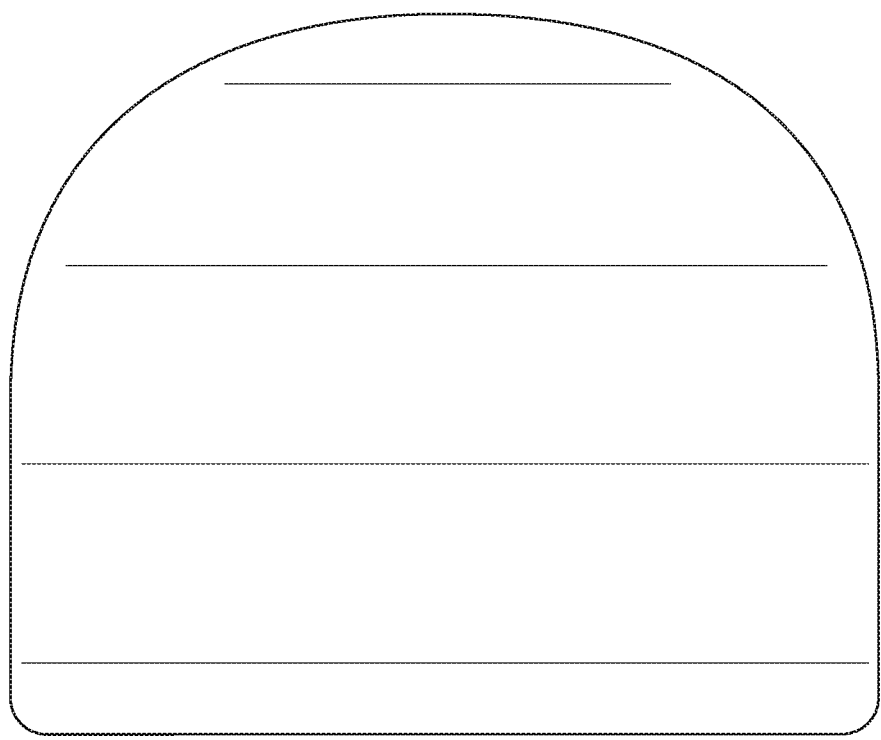
FIG. 2 illustrates a perspective view of the body member, wherein the view is of the front of the surface.
Figure 3:
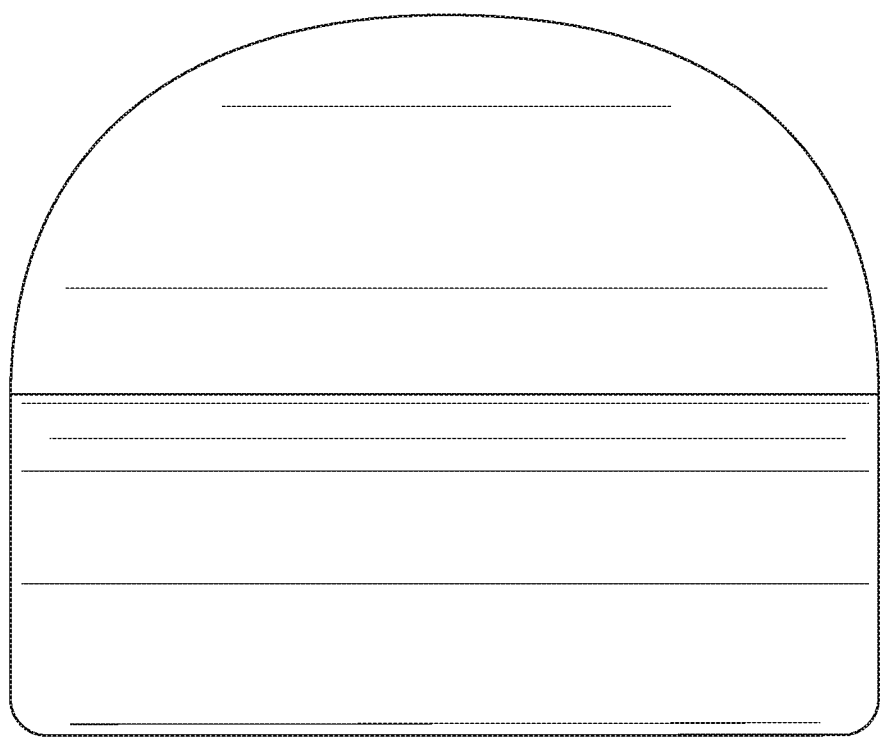
FIG. 3 illustrates a perspective view of the body member, wherein the view is of the back of the surface. Also visible is the attachment mechanism. In accordance with some embodiments, the attachment mechanism is a flap adhered to the back of the surface.
Figure 4:
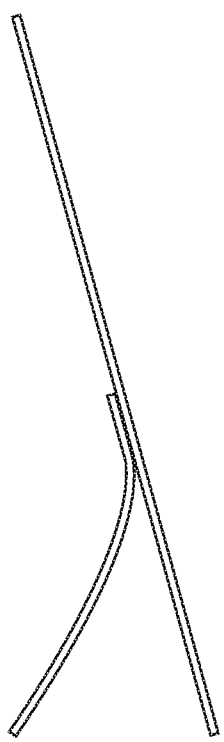
FIG. 4 illustrates a perspective view of the left side of the body member and the attachment mechanism. In accordance with some embodiments, the attachment mechanism is a flap adhered to the back of the surface.
Figure 5:
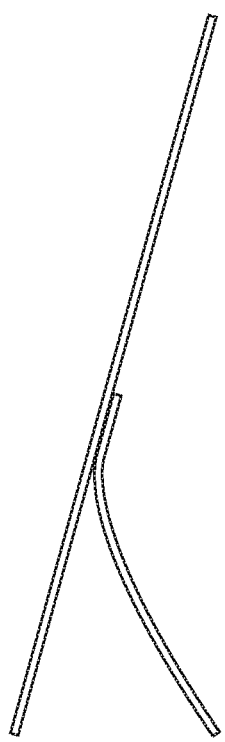
FIG. 5 illustrates a perspective view of the right side of the body member and the attachment mechanism. In accordance with some embodiments, the attachment mechanism is a flap adhered to the back of the surface.
Figure 6:
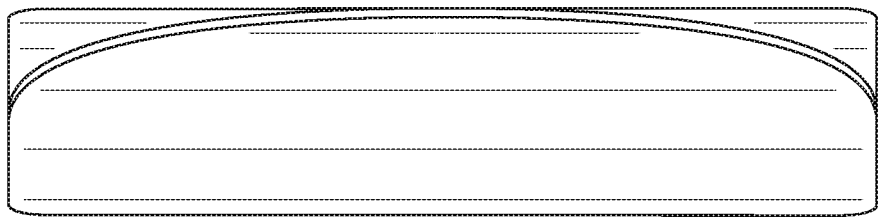
FIG. 6 illustrates a perspective view of the top of the body member. In accordance with some embodiments, the attachment mechanism is a flap adhered to the back of the surface.
Figure 7:
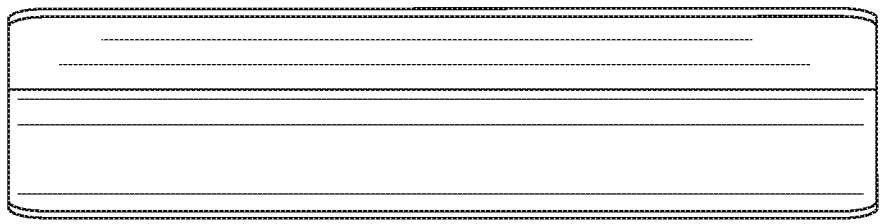
FIG. 7 illustrates a perspective view of the bottom of the body member. In accordance with some embodiments, the attachment mechanism is a flap adhered to the back of the surface.
Figure 8:
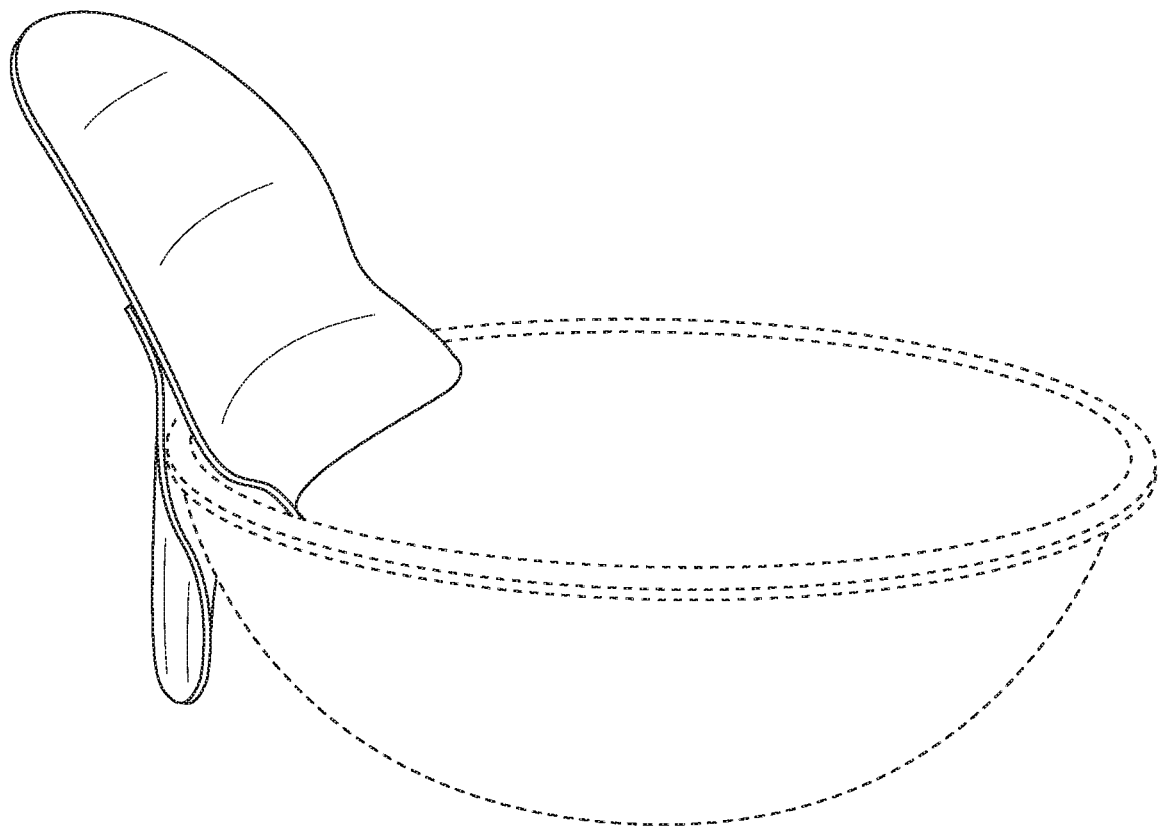
FIG. 8 illustrates an environmental view of the body member in use (i.e., the body member is attached to a bowl). In accordance with some embodiments, the attachment mechanism is a flap adhered to the back of the surface.

The present disclosure describes systems, apparatus, and methods for improved transfer of a substance between containers.

As used herein the term "sensitive ingredient" may be used to refer to a food allergen (e.g., fish, peanuts, wheat, soy, tree nuts, eggs, milk/dairy, and shellfish) or food ingredient (e.g., lactose and gluten) that can cause illness or death.

As used herein the term the term "cross-contamination" may be used to refer to the process by which some substances are unintentionally and/or unknowingly transferred from one object (e.g., a container, a kitchen utensil, or a surface) to another, or mixed with other substances. For example, in a kitchen environment, cross-contamination might relate to a substance, which may be a sensitive ingredient, unintentionally and/or unknowingly being mixed with, or tainting, other food preparations. For example, a liquid containing a sensitive ingredient, while being transferred from one container into another, might splatter into other food substances located nearby.

As used herein the term the term "spillage" may be used to refer to the act or process of spilling (i.e., causing or allowing a substance to flow over the edge of the container which holds it) or material lost or scattered by spilling.

As used herein, the term "splashing" is meant to relate to the bouncing of a liquid droplet upon impact on the liquid or solid surface. Said bounce may cause the liquid droplet to exit the receiving container. In the instant disclosure, the terms "splashing" or "splattering" are used interchangeably.

In some embodiments, the receiving container can be selected from any container that holds a substance for any period of time (e.g. a bucket, a bowl, a jar, or a tub). In a further embodiment, the container is a container used in a kitchen (e.g. a pot, a bowl, a pan, or a measuring cup). In yet another embodiment, the receiving container is a pot, a bowl, or a pan. In other embodiments, the receiving container may be a receptacle which may hold only some of the substance. For example, the receiving container may be a sieve, a colander or a strainer.

As used herein, the term "bowl" may be used to refer to any round, open-top container. Non-limiting examples of different bowls as used herein are mixing bowls, salad bowls, serving bowls, punch bowls, and serving bowls. Bowls may be made, for example, of ceramic, metal, wood, or plastic.

As used herein, the term "pot" may be used to refer to any flat bottom, round, open top container for preparing food. Non-limiting examples of different pots as used herein are stock pots, sauce pots, and braisers. Pots may be made, for example, of stainless steel, aluminum, copper, or enamel on metal.

As used herein, the term "pan" may be used to refer to any round or square, flat bottom, open top container with low side walls. In kitchen environments, pans are often used for frying or baking food. Non-limiting examples of different pans as used herein are frying pans, Dutch ovens, woks, cake pans, pie pans, springform pans, bread pans, casserole pans, saucepans, and sautépans. Pans may be made, for example, of aluminum or anodized aluminum, cast iron, copper, or stainless steel.

As used herein, the term "tub" refers to a wide, open, deep, typically round, flat bottom, container. As used herein, the term tub is used interchangeably with any terms referring to any large container, for example, a barrel, a cask, a drum, or a keg.

As used herein, the term "jar" refers to any wide-mouthed, cylindrical container. For example ajar may be a mason jar, used for canning foods (e.g., marmalade, jelly or jam). Jars may be made of glass or ceramics.

In on embodiment, the attachment mechanism is at least one of coupled to and integral with the body member. In some embodiments, the attachment mechanism comprises at least one of a flap, a port, a clip, or a clamp for receiving a rim of the wall of the container. In another embodiment, the attachment mechanism comprises one or more magnets.

In one embodiment, the attachment mechanism comprises a flap attached to the back of the surface. As used herein, the term "flap" is meant to relate to a flat piece of material hinged or attached to the surface on one side. When the surface is positioned inside of the receiving container wall, said flat piece of material is placed on top of the receiving container wall, thereby maintaining the position of the surface inside of the receiving container relative to the wall. As used herein, the "width" of the flap refers the length by which the flap is extending away from the surface when it is placed on top of the receiving container wall.

In one embodiment, the attachment mechanism comprises one or more clips attached to the back of the surface. As used herein the term "clip" is meant to relate to a fastening device which comprises a pair of opposing members held in pivotal engagement by a metal spring. Squeezing the portions of the clip members located above the spring together forces the bottom portions of the clip members apart, allowing for insertion of the receiving container wall. When the handles are released, the spring forces the bottom parts towards each other to grip the receiving container wall, thereby fastening the body member to the receiving container wall.

As used herein, the term "clamp" is meant to relate to a fastening device which comprises a C-shaped frame, wherein a first portion is attached to the surface and, when the surface is placed on the inside of the receiving container wall, a second portion is placed on top of the receiving container wall and a third portion is placed on the outside of the receiving container wall. An adjustable part (e.g. a screw) may be attached to the portion on the outside of the receiving container wall and used to apply inward pressure to fasten the surface to the container wall.

In one embodiment, the attachment mechanism comprises one or more magnets adhered to the back of the surface. In a further embodiment, the attachment mechanism comprises one or more magnets adhered to the back of the surface, and one or more additional magnets, not adhered to the back of the surface. In some embodiments, the one or more additional magnets may be placed on the outside of the receiving container wall while the surface is placed inside of the receiving container, such that the magnetic attraction between the one or more magnets adhered to the back of the surface and the one or more magnets on the outside of the container wall fasten the surface to the receiving container wall.

In some embodiments the body member comprises at least one of a plastic, a ceramic, a plant material, and a metal. In a further embodiment the body member comprises at least one of a plastic, a ceramic, a wood, and a metal. In one embodiment, the at least one plastic is at least one of silicone rubber, melamine resin, and polycarbonate. In a further embodiment, the at least one plastic is silicone rubber. In another embodiment, the at least one ceramic is at least one of earthenware, stoneware, porcelain, and china. In yet another embodiment, the at least one plant material is at least one of bamboo and wood. In another embodiment, the at least one wood is at least one of beech, cherry, walnut, birch, hickory, or maple. In another embodiment, the at least one metal is at least one of aluminum and stainless steel.

As used herein, the term "plastic" is meant to refer to synthetic or semi-synthetic organic compounds that are malleable and can be molded into solid objects. As used herein, plastics can be organic polymers and might comprise other substances. Non-limiting examples are polyvinyl chloride (PVC), polyethylene (PE), polypropylene (PP), polyethylene terephthalate (PET), maleimide, melamine resin, plastarch material, polyetheretherketone (PEEK), polyetherimide (PEI), polylactic acid (PLA), polymethyl methacrylate (PMMA), polysulfone, and silicone.

As used herein, the term "ceramic" is meant to refer to an inorganic, nonmetallic solid material comprising metal, nonmetal or metalloid elements. General properties of ceramics comprise a high melting temperature, high hardness, poor thermal and electrical, conductivity, chemical resistance and low ductility. Non-limiting examples are stoneware, earthenware, porcelain, and china.

As used herein, the term "plant material" is meant to refer to any material derived from plants or plant fibers. Non-limiting examples are, for example bamboo, straw, wicker, cotton, hemp or wood.

As used herein, the term "metal" is meant to refer to materials comprising at least one metallic element as a primary component. For example, a metal as used herein is meant to comprise pure metals and metal alloys. Non-limiting examples are aluminum, copper, chromium, iron, nickel, titanium, or steel (e.g., stainless steel, cast iron, or alloy steel).

In one embodiment, the body member is made from a flexible material. In another embodiment, the surface is made from a rigid material. In yet another embodiment, the surface is made from a malleable material. In a further embodiment, the surface is concave. As used herein, the term "concave" is meant to refer to a surface which is curved inward. In some embodiments, the inward curve guides the substance into the container during transferring. In another embodiment, the flexible material allows for the surface to adjust to the shape of the receiving container. This allows for the apparatus to be used with receiving containers (e.g., bowls, pots, pans or the like) of different shapes and sizes.

In one embodiment, the surface is coated with a non-stick material. In a further embodiment, the non-stick material is selected from at least one of a synthetic polymer (e.g., polytetrafluoroethylene), anodized aluminum, a ceramic, enamel, and silicone. In yet another embodiment, the non-stick material is polytetrafluoroethylene.

In some embodiments, the surface flares out toward the bottom of the wall of the container. In some embodiments, the surface is rounded at the top.

In one embodiment, the surface has a hole is cut out in the center at the top of the surface. In a further embodiment, the hole allows for the body member to be suspended by, for example, a hook or a nail for convenient storage.

In some embodiments, the surface includes indications associated with transferring the substance. In a further embodiment, the indications are at least one of printed, engraved, embossed, and debossed on the surface. In another embodiment, the indications are printed on stickers which are adhered to the surface.

Depending on the materials used, the utensil might be resistant to various temperatures. In one embodiment, the utensil is resistant to temperatures from about −300° F. to about 4000° F. In another embodiment, the utensil is resistant to temperatures from about −110° F. to about 2000° F. In a further embodiment, the utensil is resistant to temperatures from about 0° F. to about 1000° F. For example, the utensil is resistant to temperatures from about −110° F. to about 450° F. For example, the utensil is resistant to temperatures from about 35° F. to about 4000° F. For example, the utensil is resistant to temperatures from about −300° F. to about 2000° F. For example, the utensil is resistant to temperatures from about −60° F. to about 450° F. For example, the utensil is resistant to temperatures from about 30° F. to about 600° F. For example, the utensil is resistant to temperatures from about 0° F. to about 500° F.

In one embodiment, the utensil is resistant to temperatures from about −185° C. to about 2200° C. In another embodiment, the utensil is resistant to temperatures from about −80° C. to about 1090° C. In a further embodiment, the utensil is resistant to temperatures from about −18° C. to about 540° C. For example, the utensil is resistant to temperatures from about −80° C. to about 230° C. For example, the utensil is resistant to temperatures from about 0° C. to about 540° C. For example, the utensil is resistant to temperatures from about −180° C. to about 1090° C. For example, the utensil is resistant to temperatures from about −50° C. to about 230° C. For example, the utensil is resistant to temperatures from about 0° C. to about 590° C. For example, the utensil is resistant to temperatures from about −20° C. to about 260° C.

In one embodiment, the surface has dimensions comprising a width from about 2 cm to about 500 cm. In another embodiment, the surface has dimensions comprising a width from about 10 cm to about 50 cm. In a further embodiment, the surface has dimensions comprising a width from about 20 cm to about 30 cm. For example, the surface has dimensions comprising a width of about 20 cm, about 21 cm, about 22 cm, about 23 cm, about 24 cm, about 25 cm, about 26 cm, about 27 cm, about 28 cm, about 29 cm, or about 30 cm.

In one embodiment, the surface has dimensions comprising a height from about 2 cm to about 500 cm. In another embodiment, the surface has dimensions comprising a height from about 8 cm to about 50 cm. In a further embodiment, the surface has dimensions comprising a height from about 15 cm to about 20 cm. For example, the surface has dimensions a height of about 15 cm, about 16 cm, about 17 cm, about 18 cm, about 19 cm, or about 20 cm.

In one embodiment, the surface has dimensions comprising a width from about 2 cm to about 500 cm and a height from about 2 cm to about 500 cm. In another embodiment, the surface has dimensions comprising a width from about 10 cm to about 50 cm and a height from about 8 cm to about 50 cm. In a further embodiment, the surface has dimensions comprising a width from about 20 cm to about 30 cm and a height from about 15 cm to about 20 cm. In yet another embodiment, the surface has dimensions comprising a width of about 24 cm and a height of about 18 cm.

In one embodiment, the surface has dimensions comprising a depth of about 0.05 cm to about 20. In another embodiment, the surface has dimensions comprising a depth of about 0.1 to about 5 cm. In a further embodiment, the surface has dimensions comprising a depth of about 0.05 cm to about 0.5 cm. For example, the surface has dimensions comprising a depth of about 0.05 cm, about 0.1 cm, about 0.15 cm, about 0.2 cm, about 0.25 cm, about 0.3 cm, about 0.35 cm, about 0.4 cm, about 0.45 cm, or about 0.5 cm. In an even further embodiment, the surface has dimensions comprising a depth of about 0.2 cm to about 0.2 cm. For example, the surface has dimensions comprising a depth of about 0.10 cm, about 0.11 cm, about 0.12 cm, about 0.13 cm, about 0.14 cm, about 0.15 cm, about 0.16 cm, about 0.17 cm, about 0.18 cm, about 0.19 cm, or about 0.2 cm In one embodiment, the first portion of the surface has first dimensions comprising a first height from about 0.5 cm to about 200 cm. In another embodiment, the first portion of the surface has first dimensions comprising a first height from about 1 cm to about 60 cm. In a further embodiment, the first portion of the surface has first dimensions comprising a first height from about 4 cm to about 10 cm. For example, the first portion of the surface has first dimensions comprising a first height of about 4 cm, about 4.5 cm, about 5 cm, about 5.5 cm, about 6 cm, about 6.5 cm, about 7 cm, about 7.5 cm, about 8 cm, about 8.5 cm, about 9 cm, about 9.5 cm, or about 10 cm. In a further embodiment, the first portion of the surface has first dimensions comprising a first height from about 6 cm to about 7 cm. For example, the first portion of the surface has first dimensions comprising a first height of about 6.0 cm, about 6.1 cm, about 6.2 cm, about 6.3 cm, about 6.4 cm, about 6.5 cm, about 6.6 cm, about 6.7 cm, about 6.8 cm, about 6.9 cm, or about 7.0 cm.

In one embodiment, the second portion of the surface has second dimensions comprising a second height from about 0.5 cm to about 300 cm. In another embodiment, the second portion of the surface has second dimensions comprising a second height from about 1 cm to about 90 cm. In a further embodiment, the second portion of the surface has second dimensions comprising a second height from about 5 cm to about 15 cm. For example, the second portion of the surface has second dimensions comprising a second height of about 5 cm, about 5.5 cm, about 6 cm, about 7.5 cm, about 8 cm, about 8.5 cm, about 9 cm, about 9.5 cm, about 10 cm, about 10.5 cm, about 11 cm, about 11.5 cm, about 12 cm, about 12.5 cm, about 13 cm, about 13.5 cm, about 14 cm, about 14.5 cm, or about 15 cm. In a further embodiment, the second portion of the surface has second dimensions comprising a second height from about 9 cm to about 10 cm. For example, the second portion of the surface has second dimensions comprising a second height of about 9.1 cm, about 9.2 cm, about 9.3 cm, about 9.4 cm, about 9.5 cm, about 9.6 cm, about 9.7 cm, about 9.8 cm, about 9.9 cm, or about 10 cm.

In one embodiment, the first portion of the surface has first dimensions comprising a first height from about 0.5 cm to about 200 cm, and the second portion of the surface has second dimensions comprising a second height from about 0.5 cm to about 300 cm. In another embodiment, the first portion of the surface has first dimensions comprising a first height from about 1 cm to about 60 cm, and the second portion of the surface has second dimensions comprising a second height from about 1 cm to about 90 cm. In a further embodiment, the first portion of the surface has first dimensions comprising a first height from about 4 cm to about 10 cm, and the second portion of the surface has second dimensions comprising a second height from about 5 cm to about 15 cm. In yet another embodiment, the first portion of the surface has first dimensions comprising a first height of about 6 cm, and the second portion of the surface has second dimensions comprising a second height of about 9.5 cm. In yet another embodiment, the first portion of the surface has first dimensions comprising a first height of about 6.4 cm, and the second portion of the surface has second dimensions comprising a second height of about 9.5 cm.

In some embodiments, when the body member is coupled with the receiving container, the first portion of the surface reaches into the receiving container and the second portion of the surface extends upright outside of the container.

In one embodiment, the coupling mechanism is a flap adhered to the back of the surface and the flap is from about 0.5 cm to about 200 cm wide. In another embodiment, the flap is from about 1 cm about 60 cm wide. In a further embodiment, the flap is about 4 cm to about 12 cm wide. For example, the flap has a width of about 4 cm, about 4.5 cm, about 5 cm, about 5.5 cm, about 6.0 cm, about 6.5 cm, about 7 cm, about 7.5 cm, about 8 cm, about 8.5 cm, about 9 cm, about 9.5 cm, about 10 cm, about 10.5 cm, about 11 cm, about 11.5 cm, or about 12 cm. In an even further embodiment, the flap is about 7 cm to about 8 cm wide. For example, the flap has a width of about 7.0 cm, about 7.1 cm, about 7.2 cm, about 7.3 cm, about 7.4 cm, about 7.5 cm, about 7.6 cm, about 7.7 cm, about 7.8 cm, about 7.9 cm, or about 8.0 cm.

In one embodiment, the hole cutout in the center at the top of the surface has a diameter of from about 0.1 cm to 50 cm. In another embodiment, the hole cutout in the center at the top of the surface has a diameter of from about 0.1 cm to 5 cm. In yet another embodiment, the hole cutout in the center at the top of the surface has a diameter of about 0.1 cm to about 0.5 cm. For example, the hole cutout in the center at the top of the surface has a diameter of about 0.1 cm, about 0.2 cm, about 0.3 cm, about 0.4 cm, or about 0.5 cm.

In some embodiments, the substance to be transferred is a fluid, a liquid, a solution, a colloidal dispersion or a suspension. In a further embodiment, the substance to be transferred is a solution, an emulsion or a suspension. In another embodiment the substance to be transferred is a liquid medium, a solution, colloid, or a suspension. In one embodiment, the substance is a liquid. In some embodiments, the substance to be transferred might comprise a solid component submerged in a liquid (e.g. a solid food product in water).

As used herein the term "fluid" is meant to relate to a substance that has no fixed shape, yields easily to external pressure and is able to flow easily. Non limiting examples are liquids, gases, plasmas and plastic solids.

As used herein the term "liquid" or "liquid medium" is meant to relate to any nearly incompressible fluid, for example a liquid or semi liquid substance. Non limiting examples are soup, sauce, broth, bullion, milk, water, juice, batter, paint, or oil.

As used herein the term "solution" is meant to relate to a liquid mixture in which the minor component (the solute) is uniformly distributed within the major component (the solvent). Non limiting examples are broth, bullion, and salt water.

As used herein the terms "colloid" or "colloidal dispersion" are meant to relate to a mixture in which insoluble particles of one substance are suspended throughout another substance. For example, a gas dispersed in a liquid may form a foam. A liquid dispersed in a gas may form a liquid aerosol. A liquid dispersed in another liquid may form an emulsion. A liquid dispersed in a solid may form a gel. A solid dispersed in a gas may form a solid aerosol. A solid dispersed in a liquid may form a sol or colloidal suspension. A solid dispersed in a solid may form a solid sol. As used herein, the term "colloid" is meant to relate to the dispersed substance alone or the overall mixture. Non-limiting examples of colloids as referred to herein are soft drinks, beer, mayonnaise, milk, butter, cheese, gelatin, jelly, whipped cream, and beaten egg whites.

As used herein the term "suspension" is meant to relate to, a heterogeneous mixture containing solid particles that are sufficiently large for sedimentation (usually larger than one micrometer). The suspended particles are visible under a microscope and will settle over time if left undisturbed. This distinguishes a suspension from a colloid in which the suspended particles are smaller and do not settle. Non-limiting examples of suspensions as referred to herein are batter, dough, soup, and paint.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A kitchen utensil for transferring a substance into an open top container, the utensil comprising:
    a body member for positioning within the container, the body member comprising a surface for receiving the substance and guiding the substance into the container; and
    an attachment mechanism for removably securing the utensil to a wall of the container, such that a first portion of the surface is located within the container and a second portion of the surface is located above the wall of the container when the utensil is secured to the wall of the container, wherein a centerline defined by the surface is disposed at a non-parallel angle to a plane defined by a rim of the container when the utensil is secured to the wall of the container, wherein a first end of the centerline terminates within the container and a second end of the centerline terminates outside of the container, wherein the first portion of the surface at least partially conforms to a curvature of the container when the utensil is secured to the wall of the container to reduce at least one of splashing, splattering, and spilling of the substance during transfer into the container, and wherein a curvature of the first portion of the surface when the utensil is attached to the container is different than a curvature of the first portion of the surface when the utensil is not attached to the container.

2. The utensil of claim 1, wherein the body member comprises at least one of a plastic and a metal.

3. The utensil of claim 2, wherein the plastic is silicone rubber.

4. The utensil of claim 2, wherein the metal is at least one of aluminum and stainless steel.

5. The utensil of claim 1, wherein the surface is concave when the utensil is attached to the container.

6. The utensil of claim 1, wherein the surface is coated with a non-stick material.

7. The utensil of claim 6, wherein the non-stick material is polytetrafluoroethylene.

8. The utensil of claim 1, wherein the surface flares out toward the bottom of the wall of the container.

9. The utensil of claim 1, wherein the utensil is resistant to temperatures from about −110° F. to about 450° F.

10. The utensil of claim 1, wherein the attachment mechanism is at least one of coupled to and integral with the body member.

11. The utensil of claim 1, wherein the attachment mechanism comprises at least one of a flap, a port, a clip, and a clamp for receiving a rim of the wall of the container.

12. The utensil of claim 1, wherein the surface has dimensions comprising a width from about 2 cm to about 500 cm and a height from about 2 cm to about 500 cm.

13. The utensil of claim 1, wherein the first portion of the surface has first dimensions comprising a first height from about 0.5 cm to about 200 cm, and the second portion of the surface has second dimensions comprising a second height from about 0.5 cm to about 300 cm.

14. The utensil of claim 1, wherein the substance is at least one of a liquid medium, a solution, a colloid, and a suspension.

15. The utensil of claim 1, wherein the container is at least one of a pot, a bowl, and a pan.

16. The utensil of claim 1, wherein the attachment mechanism is external to the surface.

17. A method of transferring a substance between containers comprising positioning the body member of the apparatus of claim 1 within the receiving container and securing the utensil to the wall of the container such that the first portion of the surface is located within the container and the second portion of the surface is located above the wall of the container, wherein the centerline defined by the surface is disposed at a non-parallel angle to the plane defined by the rim of the container, wherein the first end of the centerline terminates within the container and the second end of the centerline terminates outside of the container.

18. The method of claim 17, wherein the attachment mechanism is a flap and securing the utensil to the wall of the container comprises placing the flap over the rim of the wall of the container.

19. The method of claim 17, wherein the body member comprises silicone rubber.

* * * * *